United States Patent [19]
Myers

[11] Patent Number: 6,085,147
[45] Date of Patent: Jul. 4, 2000

[54] SYSTEM FOR DETERMINATION OF OPTIMAL TRAVEL PATH IN A MULTIDIMENSIONAL SPACE

[75] Inventor: William Loring Myers, Boulder, Colo.

[73] Assignee: University Corporation for Atmospheric Research, Boulder, Colo.

[21] Appl. No.: 08/938,246

[22] Filed: Sep. 26, 1997

[51] Int. Cl.⁷ .......................... G06F 163/00; G06F 15/00
[52] U.S. Cl. .......................... 701/209; 701/200; 701/201; 701/120; 701/302; 342/33; 342/36; 342/38
[58] Field of Search .................................. 701/209, 120, 701/300–2, 123, 200, 201, 202; 342/26–30, 33, 4, 36–8

[56] References Cited

U.S. PATENT DOCUMENTS

| | | | |
|---|---|---|---|
| 4,760,530 | 7/1988 | Liden ...................................... | 701/121 |
| 5,408,413 | 4/1995 | Gonser et al. ........................... | 701/123 |
| 5,493,309 | 2/1996 | Bjornholt ................................ | 701/301 |
| 5,740,047 | 4/1998 | Pilley et al. ............................. | 701/301 |

OTHER PUBLICATIONS

Jimmy Krozel, Tara Wiedner & George Hunter "Terminal Area Guidance Incorporating Heavy Weather", American Institute of Aeronautics & Astronautics, Inc., presented at AIAA Guidance, Navigation, & Control Conf.., New Orleans, LA, Aug. 1997.

*Primary Examiner*—William A. Cuchlinski, Jr.
*Assistant Examiner*—Yonel Beaulieu
*Attorney, Agent, or Firm*—Duft,Graziano&Forest,P.C.

[57] ABSTRACT

The present automated vehicle travel path determination system which computes a travel path for a vehicle from an origination point to a destination point based on the operating characteristics of the vehicle as well as phenomena extant in the multidimensional space, which phenomena have an impact on the cost of operation of the vehicle. This vehicle travel path determination system can concurrently consider a plurality of vehicle operating characteristics in selecting the travel path. The travel path is optimized for a weighted selection of a number of cost factors, which weighted selection represents a desired combination of cost factors for the operation of this particular vehicle. This vehicle travel path determination system also considers the time varying nature of the phenomena that exist within the multidimensional space and the impact these time varying phenomena have on the vehicle as it traverses the travel path. The present automated vehicle travel path determination system is disclosed as a flight path calculation system for aircraft, although the concepts of this system are applicable to any form of vehicle travel.

34 Claims, 5 Drawing Sheets

SLICE 1   SLICE 2   SLICE 3   SLICE 4 though the travel path accounts for meteorological hazards to thereby ensure the safety and comfort of the passengers in the aircraft.

SYSTEM FOR DETERMINATION OF OPTIMAL TRAVEL PATH IN A MULTIDIMENSIONAL SPACE

FIELD OF THE INVENTION

This invention relates to systems for the computation of travel paths and, in particular, to a system that computes a travel path for a vehicle through a multidimensional space, which travel path optimizes the cost of operation of the vehicle according to at least one predetermined vehicle operating criteria.

PROBLEM

It is a problem to select a cost optimized travel path for a vehicle from an origination point to a destination point in an efficient and automated manner. The selection of a travel path is typically done on a manual basis or on a limited automated basis to optimize the cost of operation of a vehicle based upon a single one of a plurality of vehicle operating criteria which include, but are not limited to: fuel economy, time of travel, safety, and traffic avoidance. Existing vehicle travel path determination systems are unable to consider multidimensional spaces and, in particular, the time varying characteristics of the multidimensional space in computing the travel path. Furthermore, existing vehicle travel path determination systems typically focus on only a single vehicle operating characteristic in computing the travel path, rather than considering the interrelationship of a plurality of the vehicle operating characteristics as well as the time-varying conditions that exist in the multidimensional space.

An example of a travel path computation situation entails aircraft operations, wherein an aircraft is the vehicle that must travel from an origination airport to a destination airport, with the flight originating at a first predetermined time and scheduled to arrive at the destination airport at a second predetermined time. A significant cost factor in calculating the flight path for an aircraft is fuel consumption, since the fuel costs of operating an aircraft can be considerable. In passenger aircraft, another contributing cost factor is the avoidance of meteorological hazards to thereby ensure the safety and comfort of the passengers in the aircraft.

The calculation of a flight path for commercial airliners is typically done on a predetermined segment basis, wherein the aircraft travel path is represented by a series of piecewise linear flight segments from point to point. Within this sequence of segments, the aircraft can maneuver around meteorological hazards that are encountered and can make minor altitude adjustments in order to avoid significant headwinds which would seriously impact fuel consumption. This flight path determination for aircraft represents a crude cost optimization system, using predetermined flight segments and manually determined course corrections, to account for meteorological hazards as they are encountered by the aircraft, rather than on a precomputed basis. This renders the cost optimization system fairly inefficient, since anticipation of meteorological hazards or other factors in the flight path determination prior to the departure of the aircraft from the origination point could result in a far more efficient operation of the aircraft. Thus, maneuvering around a meteorological hazard can consume far more fuel than anticipating the presence, locus and predicted movement of the meteorological hazard prior to the departure of the aircraft from the origination point.

In commercial air travel, it is anticipated that the existing air traffic control system may be significantly revised from the existing detailed control of aircraft operations by the air traffic controllers along the entirety of the flight path to a "gateway" system wherein the air space is divided into a plurality of large volumetric sections, each of which contains entry and exit points through which aircraft must travel. The air traffic control function in this proposed system regulates the sequence in which aircraft pass through these portals in exiting a first air space volumetric section and entering a second air space volumetric section that is juxtaposed to the first air space volumetric section. The aircraft would then have relative freedom in traversing a volumetric section from the entrance portal to the exit portal, and a predetermined flight segment would no longer be a necessity in the operation of the aircraft. In this eventuality, the existing system of determining flight paths on predetermined segments becomes obsolete, since the aircraft have relative freedom in selecting their flight path through each volumetric section of air space. Therefore, in such an environment, there are no flight path determination systems which are available to assist in the routing of aircraft in a manner to optimize the cost of operation of the aircraft.

An analogous travel path computation problem exists in automotive traffic, especially commercial freight hauling, wherein a vehicle must traverse a certain travel space from a point of origination to a destination point with the likelihood of a plurality of intermediate stops being included in the travel path. There are existing vehicle locator systems which use the Global Positioning System (GPS) to precisely locate the vehicle as it traverses the travel path. However, there are no existing travel planning systems that can make use of this vehicle location information to select a travel path for the vehicle, which travel path accounts for the existence of road hazards, traffic delays, weather conditions and the like. The selection of travel paths for automotive travel is left in the hands of the vehicle operator who dynamically alters the travel path as a function of encountered travel conditions. The anticipation of these travel conditions and the predetermination or dynamic determination of a travel path would render vehicle operation far more efficient than the reactive method of operation that presently exists.

There exists no automated travel path determination system that can automatically select a travel path for a vehicle which is operational in a multidimensional space, which travel path represents a cost optimization based upon a plurality of the operating characteristics of the vehicle. There also does not exist any automated travel path computation system that can anticipate the time varying conditions extant in the multidimensional space which effect the cost of operation of the vehicle and the selection of the travel path.

SOLUTION

The above described problems are solved and a technical advance achieved in the field by the present automated travel path determination system which computes a travel path for a vehicle from an origination point to a destination point based on the operating characteristics of the vehicle as well as phenomena extant in the multidimensional space, which phenomena have an impact on the cost of operation of the vehicle. This vehicle travel path determination system can concurrently consider a plurality of vehicle operating characteristics in selecting the travel path. The travel path is optimized for a weighted selection of a number of cost factors, which weighted selection represents a desired combination of cost factors for the operation of this particular vehicle. This vehicle travel path determination system also considers the time varying nature of the phenomena that exist within the multidimensional space and the impact these time varying phenomena have on the vehicle as it traverses the travel path. Furthermore, the user can vary the initial conditions to ascertain the optimized travel path in the case of interactive initial conditions that effect the cost of the travel path.

The present automated vehicle travel path determination system is disclosed as a flight path calculation system for aircraft, although the concepts of this system are applicable to any form of vehicle travel. In aircraft operations, the operating characteristics of an aircraft which can be considered by the vehicle travel path determination system include, but are not limited to: speed of travel, fuel consumption, passenger safety and comfort, hazard avoidance, restricted air space, operating altitude limitations, and other aircraft traffic. The multidimensional space that is considered in determining the travel path of an aircraft consists of the three dimensional volumetric space through which the aircraft travels from its origination point to its destination point, which space includes the in-airport ground operations prior to takeoff and after landing the aircraft. Another dimension that is of interest in this vehicle travel path computation is the temporal nature of both the three dimensional volumetric space and the vehicle operating characteristics. These time varying factors can either be measured or predicted to thereby enable the vehicle travel path determination system to anticipate their effect on the cost of aircraft operations as the aircraft traverses the multidimensional space.

In a typical operation, the aircraft operator inputs data to the vehicle travel path determination system indicative of the origination point, destination point, and estimated time of departure. The aircraft operator also indicates the type of aircraft and its operating characteristics, if the aircraft operating characteristics data are not already stored in the system. The aircraft operator can also input data indicative of the various cost factors that are to be considered in the computation of the travel path. These cost factors are typically optimization items such as fuel economy and hazard avoidance. The aircraft operator can also assign weights to these various cost factors to indicate their relative significance to the aircraft operator in computing the travel path. The vehicle travel path determination system itself can consider numerous cost factors which present overriding considerations that cannot be overridden by the aircraft operator. For example, in the case of small aircraft, the maximum effective operating altitude can be a significant determining factor in selecting the travel path. In flying through mountainous regions, the maximum effective altitude of the aircraft must be significantly in excess of the height of the mountain peaks, otherwise the small aircraft must be routed around these hazards. Thus, the vehicle travel path determination system considers invariant phenomena as well as time varying phenomena in computing the travel path. More subtle factors can also be considered by the vehicle travel path determination system, such as the safety of operating an aircraft in a certain airspace. It is not uncommon for the operator of a small aircraft to be inexperienced and misjudge the dangers of mountain flying. Thus, even though the maximum effective altitude of the small aircraft is sufficient to traverse a certain path through a mountainous region, the loss of power experienced by such an aircraft at that altitude may render flight along that travel path unreasonably dangerous to an inexperienced pilot in view of the unpredictable and severe meteorological phenomena that occur at those locations. Therefore, even though the aircraft operator may wish to select a travel path over a certain mountainous region, the vehicle travel path determination system may override the aircraft operator travel path selection due to the unreasonable nature of the risks that would be encountered by such an aircraft in using such a travel path.

The vehicle travel path determination system therefore considers a plurality of operating characteristics of the vehicle and a plurality of factors that exist in the multidimensional space which can effect the operation of the vehicle, to compute a travel path which represents the optimization of at least one and more likely a plurality of cost factors, which cost factors are weighted in their significance by the aircraft operator. The travel path that is selected by this vehicle travel path determination system represents a sophisticated and user-customizable computation system which takes into account not only time invariant but also time varying phenomena in selecting the travel path.

DETAILED DESCRIPTION

The present automated vehicle travel path determination system computes a travel path for a vehicle, which travel path extends from an origination point to a destination point and is determined based on the operating characteristics of the vehicle as well as those phenomena extant in the multidimensional space which have an impact on the cost of operation of the vehicle. This vehicle travel path determination system can concurrently consider a plurality of vehicle operating characteristics in selecting the travel path. The travel path is optimized for a weighted selection of a number of cost factors, which weighted selection represents a desired combination of cost factors in the vehicle operation. This vehicle travel path determination system also considers the time varying nature of the phenomena that exist within the multidimensional space and the impact these time varying phenomena have on the vehicle as it traverses the travel path. The automated vehicle travel path determination system is disclosed herein as a flight path calculation system for aircraft, although the concepts of this system are applicable to any form of vehicle travel.

System Architecture—Travel Path Determination System

Figure 1:
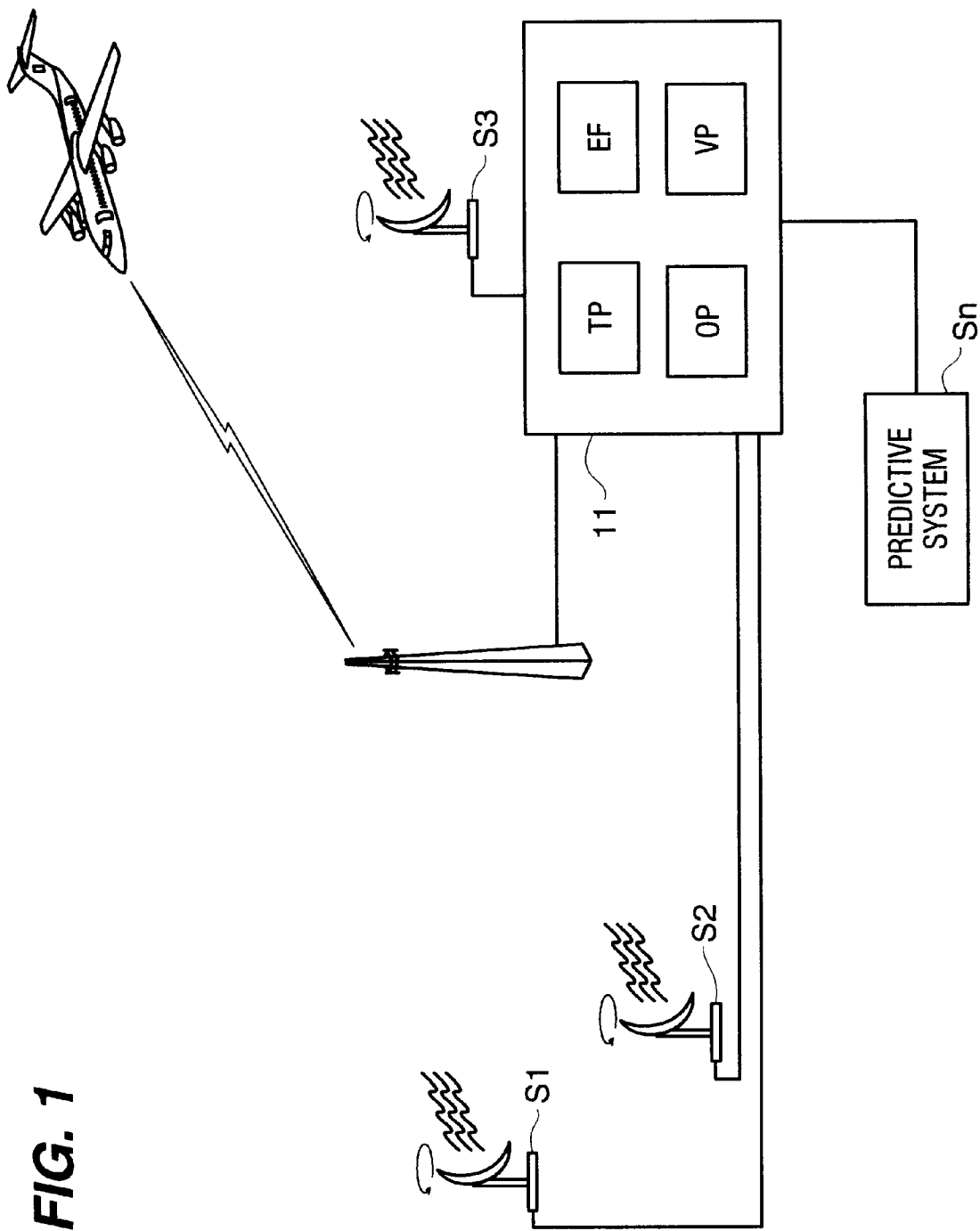
FIG. 1 illustrates in block diagram form an overall view of the architecture of the present system for determining the travel path in a multidimensional space.

The overall architecture of the vehicle travel path determination system 1 of the present invention is disclosed in block diagram form in FIG. 1. The vehicle travel path determination system 1 comprises a processor 11 which receives input from at least one and preferably a plurality of sources S1–Sn which sources generate data representative of the nature of the multidimensional space of interest. These sources S1–Sn can include sensor based systems that determine the presence, locus and characteristics of various phenomena extant in the multidimensional space. In particular, the sources S1–S3 can include, but are not limited to: meteorological monitoring systems S1, vehicle identification systems S2, topographical representation systems S3, and the like. Each of these sources generates an output which typically comprises a data stream or data file that includes information computed by the source and of interest to the vehicle travel path determination system 1. In addition, the sources S1–S3 can include predictive systems Sn, which produce model data indicative of a predicted state of the multidimensional space at some time in the future, which model data may be based upon the data received from the sensor-based sources S1–S3. The model data is generally more valuable to the vehicle travel path determination system 1 than real-time sensor data (non-predictive) if the travel period extends far into the future, since it is the future locus of hazards that are of interest.

The data generated by the various sources S1–Sn are transmitted to the vehicle travel path determination system 1 and received therein by the vehicle performance effecting system EF. The data generated by the various sources S1–Sn can be selectively incorporated into the travel path determination process TP, since these sources S1–Sn may generate data which is not considered by the vehicle travel path determination system 1. Thus, various thresholds can be established to filter the data generated by the various sources S1–Sn, so that only the data presently pertinent to the travel path determination process TP is considered. Alternatively, all data generated by sources S1–Sn can be received by the vehicle travel path determination system 1, in which case the vehicle performance effecting system EF represents the component of the travel path determination process TP which characterizes the received data in a manner that converts the raw data into a form which is usable by the travel path determination process TP.

Another component of the vehicle travel path determination system 1 is a vehicle performance data system VP which functions to identify the operating characteristics of a vehicle V which is extant in the multidimensional space. This vehicle performance data system VP stores data for a plurality of vehicles, which data characterize the operation of the vehicle V. For example, in the aircraft situation, the data can denote: the type of aircraft, maximum speed, maximum altitude, fuel capacity, range of operation, and the like. This data enables the vehicle travel path determination system 1 to compute an optimal travel path as a function of the limitations of the vehicle V which traverses the travel path. In addition, another optional component of the vehicle travel path determination system 1 is an operator performance data system OP which functions to identify the operating characteristics of an operator who operates a vehicle V which is extant in the multidimensional space. This operator performance data system OP stores data for a plurality of operators, which data characterize the limitations of the operator. For example, in the aircraft situation, the data can denote: the type of aircraft which the operator is qualified to operate, the instrument rating of the operator, amount of experience of the operator, aircraft operator's license status, and the like. This data enables the vehicle travel path determination system 1 to compute an optimal travel path for the vehicle V also as a function of the limitations of the operator.

The travel path determination process TP represents the algorithmic process, described in additional detail below, which is used by the vehicle travel path determination system 1 to incorporate all of the data provided by the above-noted components, as well as user provided data, to compute a travel path from an origination point to a destination point, which travel path is optimized pursuant to predetermined criteria. There are many possible implementations of the vehicle travel path determination system 1, as well as its components and the example provided herein simply represents an example of the system as implemented for use in the aircraft travel path environment. The vehicle travel path determination system 1 can also be implemented in whole or in part in the vehicle V itself. In particular, the vehicle V itself can include the processor 11 with resident travel path determination process TP and vehicle performance data system VP to thereby perform the necessary computations. Furthermore, the data obtained from sources S1–Sn can be transmitted via radio transmitter T to the vehicle V as the data is available, or as requested by the processor 11 in the vehicle V.

Method of Operation—Travel Path Determination System

Figure 2:
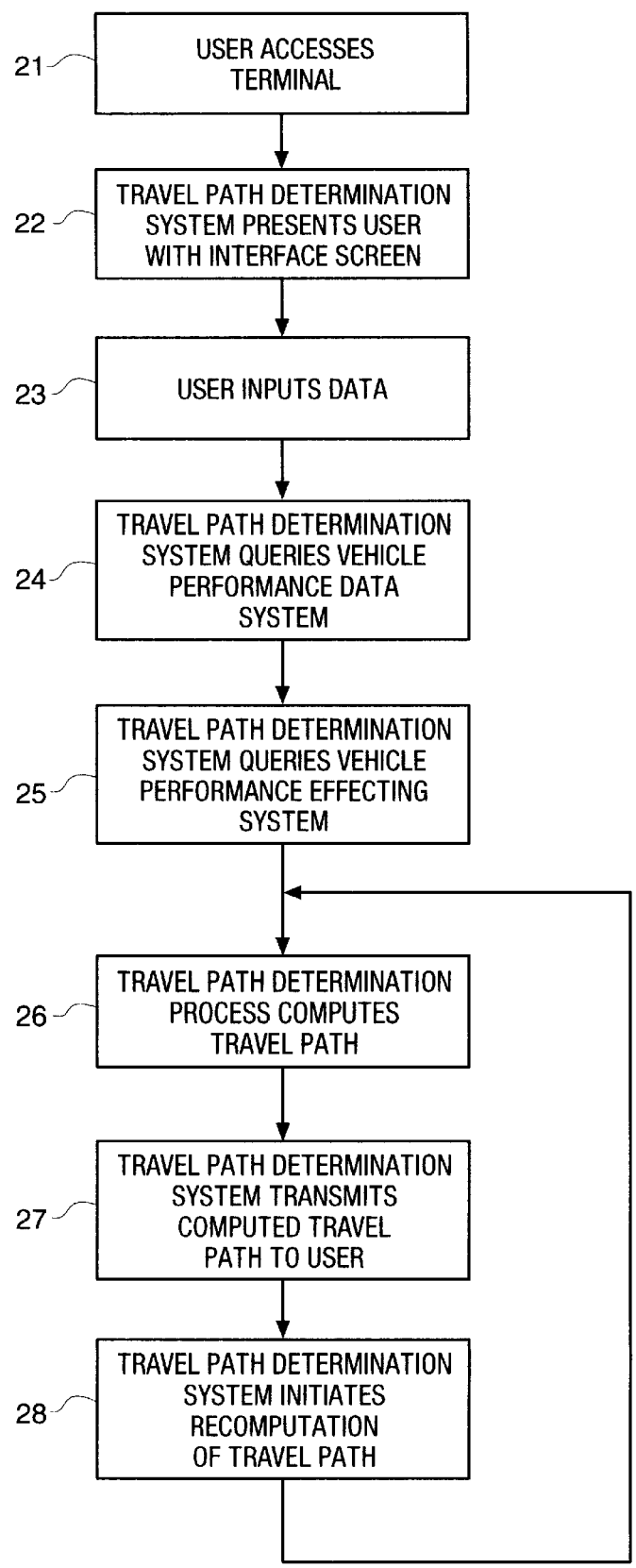
FIG. 2 illustrates in flow diagram form the operational steps taken by the present system for determining a travel path in a multidimensional space in performing a typical travel path computation.

The above characterized vehicle travel path determination system 1 operates in general fashion as illustrated in the flow diagram of FIG. 2. In particular, the user inputs data into vehicle travel path determination system 1 to characterize the desired trip. In particular, the user accesses a terminal at step 21, which terminal is either remotely located from travel path determination system 1 and connected thereto via a communication connection or directly connected thereto. The vehicle travel path determination system 1 at step 22 presents the user with a user interface screen that provides the user with a means of providing the information necessary for the vehicle travel path determination system 1 to perform the desired function. Thus, in the aircraft example, the user must provide data at step 23 which, at a minimum is representative of an origination point, a destination point, a desired time of departure, and identification of the type of aircraft. There is additional data which may optionally be provided by the user for use in the travel path determination process, such as, but not limited to: desired arrival time, weighting factors ascribed to various hazards, identification of the pilot, number of passengers/load weight, quantity of fuel in the aircraft tanks, intermediate stops incorporated into the travel, desired cost factor to be optimized, and the like.

The data input by the user is stored in memory in the vehicle travel path determination system 1, which at step 24 queries vehicle performance data system VP and operator performance data system OP to obtain additional information which is required to compute an optimized travel path. The vehicle travel path determination system 1 at step 25 then queries vehicle performance effecting system EF to obtain the data which is collected from the various sources S1–Sn. The travel path determination process TP now has sufficient data from which the optimal travel path can be computed. The travel path computation is initiated at step 26 by the travel path determination process TP, which computes the travel path as described below. The computed travel path is then output at step 27 to the user by the vehicle travel path determination system 1. The computed travel path can be retained in memory in the vehicle travel path determination system 1 for future reference, such as to provide dynamic updates. Thus, the vehicle travel path determination system 1 can at step 28 automatically, or on a polled basis, recompute the optimal travel path produced at step 26, based upon the present status of the phenomena that are extant in the multidimensional space. This recomputed travel path is then retransmitted to the user at step 27.

The recomputed travel path can also be computed locally, on board the aircraft, with only a compact data representation of the meteorological events being uplinked to the aircraft. As noted below, once the basic travel path is computed, further optimizations of the travel path can be computed by further optimization iterations. The computational load on the iterative or update processing is greatly reduced from the original travel path computations because a significant portion of the multi-dimensional space is no longer considered, and it is only deviations from the originally computed travel path that are determined.

Travel Path Characteristics

Figure 3:
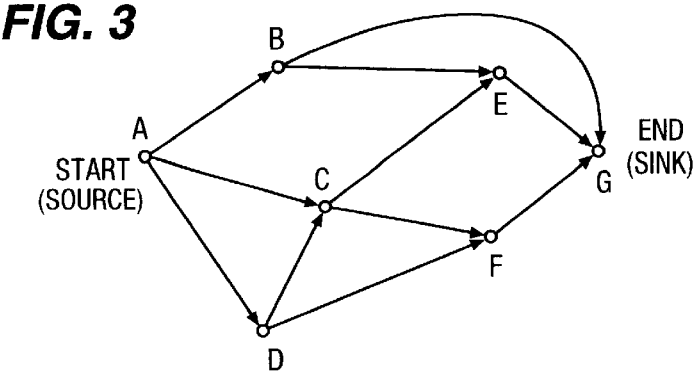
FIGS. 3–7 illustrate in graphical form the implementation of the various steps of the method of operation of FIG. 2.

A travel path through a multidimensional space connects an origination point with a destination point by means of a continuous curve. The continuous curve can be a curvilinear line or it can be a series of linear segments which approximate a continuous curve. For the purpose of this description, the travel path is considered a continuous curve even though it can comprise a plurality of straight line segments. In addition to the travel path being a continuous curve, the curve is a directed curve as shown in FIG. 3 in that the vehicle V travels in a predetermined direction along the curve from the originating point to the destination point without retracing a portion of the travel path. The directed curve can be represented as a parameterized function which associates each point (x, y, z) on the curve in the multidimensional space with a time t, with t increasing in value from the start of the directed curve to the end of the directed curve. This parameterized function not only describes the location of the vehicle V in the multidimensional space but also describes the velocity of the vehicle V throughout its travel. The multidimensional space is typically represented by Cartesian coordinates of x, y, and z directions with the x and y axes as shown in FIG. 1 defining a horizontally oriented plane throughout the multidimensional space and the z axis representing an azimuthal direction which is perpendicular to the x, y plane. It is obvious that other coordinate systems can be used to represent the multidimensional space and for the purpose of simplicity of description, the Cartesian coordinate system is used herein.

A cost function can be associated with any curvilinear parameterized function. The cost function associates the points on the directed curve with a value or a cost at that point. The cost at that point can represent the computation of some value which is indicative of the sum of one or more factors which comprise the cost function. By integrating the cost function along the length of the directed path, a single value can be obtained which is representative of the cost of a vehicle V traversing the directed path. As noted above, this cost can take into account a plurality of factors, such as: time expended, environmental hazards encountered, fuel expended, and the like. These factors can be weighted so that the relative importance of each is a measure of their significance to the vehicle operator. In this paradigm, for a given origination point and destination point and departure time, there are an infinite number of paths that could take one to the destination point. The goal of the travel path determination system is to find an optimal path which minimizes the cost function that is defined for this vehicle V and this travel path.

Aviation Example

In the case of aircraft travel, the travel path can be represented as the extent of aircraft travel from the origination point to the destination point, which may or may not be inclusive of the travel of the aircraft from its point of loading to the point of takeoff and the point of landing to the point of unloading. For simplicity of description, consider the travel path to comprise the path from the point of takeoff to the point of landing. Given these constraints, any location in the multidimensional space that is at or below the existing ground surface is obviously considered an unacceptable part of the travel path. The travel path determination system therefore excludes this volumetric space from consideration in determining the travel path. In addition to this obvious constraint, each aircraft has a maximum operating altitude characteristic that delimits the upper bounds of the multidimensional space which must be considered by the travel path determination system for this aircraft. Likewise, the region outside the extent of space which lies between the origination point and destination point need not be considered in computing the travel path. Additional operating constraints in this environment consist of mandatory minimum altitude requirements for this particular aircraft as well as predefined and mandatory operating rules with regard to aircraft takeoff and landing for noise abatement and hazard avoidance purposes. These constraints must be considered by the system in determining the travel path.

In computing a travel path for an aircraft, the multidimensional space can be viewed as a volumetric region which is occupied by a plurality of phenomena that must be considered in the determination of the travel path for the aircraft. These phenomena can be classified as either immutable or time varying (dynamic). An example of immutable phenomena are regions of restricted air space, such as over a military base or a region of airspace over the territorial extent of unfriendly nations, or the airspace above and around an airport, which airport is not the origination point or destination point. The phenomena that exist within the multidimensional space are typically time varying and more difficult to model and use in the computation of the travel path. These time varying phenomena can include other air traffic and meteorological phenomena. For the purpose of illustrating the operation of the travel path determination system the meteorological phenomena example is used herein. The term meteorological phenomena as used herein loosely defines all atmospheric conditions which can have an effect on the operation of the aircraft in the multidimensional space. Typical examples of meteorological phenomena include: thunderstorms, snow storms, fog, headwinds, temperature conditions and the like. There presently exist meteorological monitoring systems which use atmospheric models to predict the locus, extent of dynamic regions of meteorological hazard, such as icing conditions or turbulence, which can negatively effect the travel of the aircraft through the regions of the multidimensional space. The degree of severity of these meteorological phenomena in terms of their effect on the aircraft operation can be estimated. Atmospheric models used in the meteorological monitoring system also predict winds throughout the multidimensional space. In considering aircraft operations, the horizontal component of these winds is the dominant factor and therefore the vertical component of the winds can be considered negligible unless it exceeds a certain predetermined minimum threshold over which the vertical component significantly effects the aircraft operation. The winds in the multidimensional space typically vary over time, which causes varying effective travel rates for the aircraft along the travel path. In addition, head winds are typically experienced at high altitudes while tail winds are often encountered at lower altitudes on a given route.

For the purpose of illustration, the following example shows a cost function which is a measure of the time from time of travel from the point of origination to the destination point. Infinite penalties are assumed for traversing weather impacted airspace, terrain occupied space or altitudes too high for the aircraft. The optimal route is therefore the fastest path from the origination point to the destination point. In computing this travel path, a model of aircraft performance is used which is extremely simple, in that it calculates aircraft direction and speed by the vector addition of the flight direction vector and the wind vector. This simplistic model is used for illustration purposes and a more rigorous model of aircraft performance in various wind conditions would be used to provide increased accuracy of the travel path. In addition, the model output is presented on a four-dimensional grid, to enable the system to interpolate the results to any specified time and three-dimensional location in the multi-dimensional space.

Travel Path Computation Algorithm

There are many potential algorithms that can be used to find an optimal travel path through the multidimensional space. Some of these algorithms attempt to find an analytical solution while others attempt to find a reasonable approximation to an analytical solution. The algorithm selected for this purpose can find an arbitrarily precise approximation to the true solution. In addition, there are some algorithms which fail to operate properly since they find local minima in a manner similar to the problems encountered while finding global minimum of scalar functions using Newton's method. While analytical descriptions of the computations that are required to provide a true measure of the cost function may be desirable, the computational cost of setting up and solving analytical equations is not only complex but at times is not well understood. Furthermore, an iterative approach of deforming an initial guess curve to obtain progressively better approximations to the analytical solutions tends to get stuck in local minima and may be unable to iterate to the global minimum that is required for the travel path. Therefore, the approach taken to provide the computation algorithm of the present travel path determination system makes use of a graph theory based approach to find a global approximation of the optimal travel path solution. If necessary, a further iterative approach can be used to refine the approximation to the global minimum.

Figure 4A:
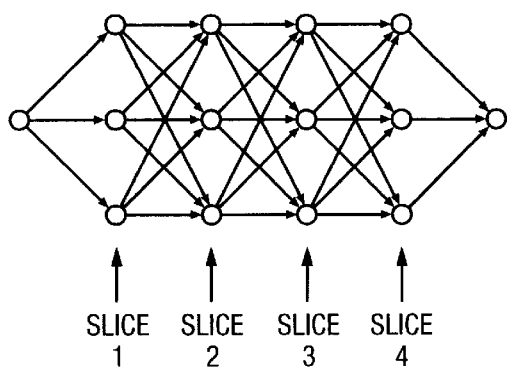
Figure 4B:
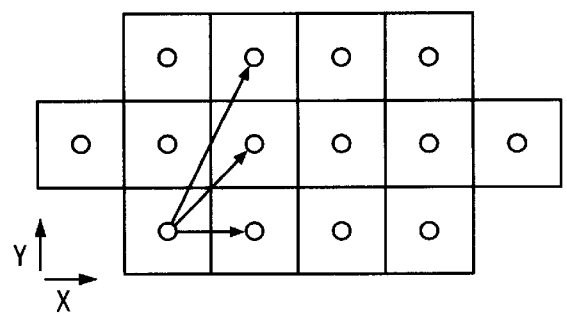
Figure 5:
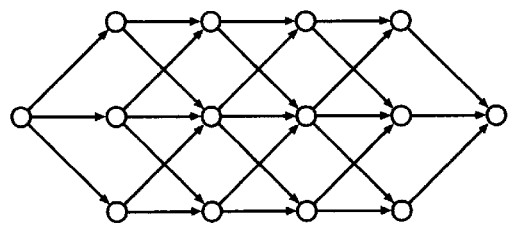
Figure 6:
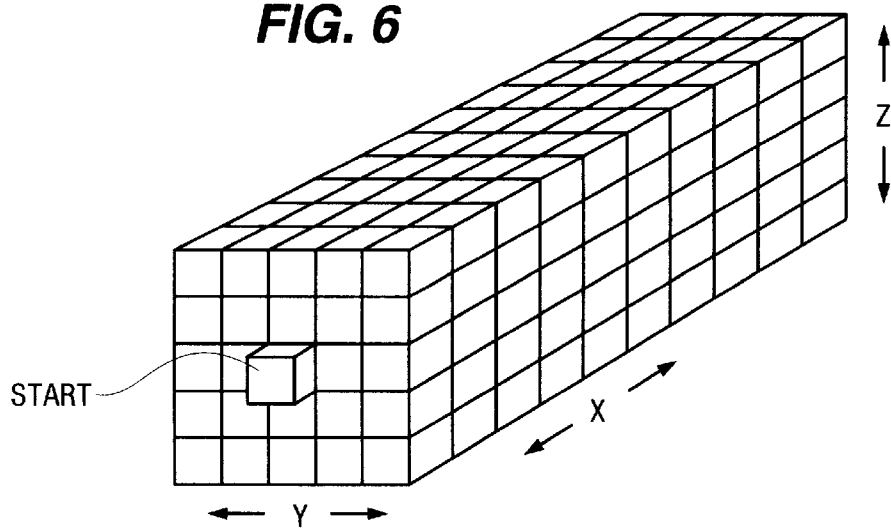

The graph theory approach uses a directed graph which contains a plurality of nodes and directed edges, where each directed edge connects a pair of the plurality of nodes. The directed edges are used in this approach since the directional travel of the vehicle V is from the origination point to the destination point and the edges which interconnect the nodes therefore need to be directed to ensure forward motion of the vehicle V toward its ultimate destination. A time dependent cost function can be associated with any of the directed edges of this graph. Therefore all the continuous paths which lead from the origination point to the destination point are of interest in performing these computations, and the time that the vehicle V arrives at a particular node is a factor in the computation for the time dependent costs. Clearly, the graph must be acyclic in order to prevent the cost function computation from traversing the same path segment repeatedly in computing the travel path. In setting up the graph of the multidimensional space, consider a two-dimensional view of the multidimensional space shown in FIG. 4 wherein there are layers of nodes with each row in each layer being perpendicular to the direction of travel. There are many potential connections between the various rows as shown in FIGS. 4 and 5. The graph network of FIG. 4 leads to better results than the graph network of FIG. 5, however it requires additional computation complexity to implement. These two instances are merely examples of the many graph theory approaches that can be used to perform the computations that are required. The two-dimensional approach of this process can be expanded to three dimensions, using slices of cubes rather than squares of rows. The graph of interconnectivity in the three-dimensional case is given by a single directed edge from every node in slice I to every node in slice I+1 as shown in FIG. 6. The total number of paths is provided by the equation: number of paths $(NP)=(ny*nz)^{nx}$.

This equation seems computationally overwhelming but there are techniques which can bring this number down to a computational order of $nx*(ny*nz)^2$. This makes the algorithm practical to use in this particular computation. The technique used is known as a dynamic programming method which computes a least cost to any point in the slice I. Using the costs for that entire slice, the dynamic programming method begins on the next slice by examining all of the paths to a given node. The dynamic programming method then calculates a cost for each of those edges and adds them to the minimal cost for the start nodes of the edges. The initiation of this process is easy since the first slice has nodes whose cost can be determined from the origination point to those nodes. Once the minimum cost on the first slice has been determined, it is relatively easy to work forward through the graph to determine the minimum costs at all nodes in the subsequent slices as well as the destination node. Having determined these, it is relatively easy to work back through the graph to determine the travel path giving this minimum cost to any node, in particular, the destination node. The dynamic programming method provides a set of directed edges with coordinates $x_i$, $y_i$, $z_i$ which approximate the optimal route through the multidimensional space. Having found the general region of the multidimensional space which contains the minimum, an iterative technique can be used to refine this approximation. The iterative technique is performed in a simplistic manner by moving each point in the y and/or z direction and seeing if the resultant cost is greater or less than before. This multidimensional coordinate system in which the graph is laid out can be assumed to lie along the equator of the globe for computational purposes. By performing rotations on the globe, the origination point and destination point can be brought to lie on the equator with the direction of travel being counterclockwise. In practice, the strip containing the solutions tends to be relatively narrow. By placing the graph nodes on equally spaced latitude and longitude points at various altitudes within the strip, the problem can essentially be treated as a flat earth problem within the strip. The curvature of the earth within the strip is negligible.

Complex Cost Computation For A Single Segment

Cost Determination for a Single Segment

The computation of the cost for a single segment of the travel path is described herein and this computation can be extrapolated for use with a multi-segment path. In particular, in the aircraft example noted above, there are a plurality of factors which must be considered in the computation of cost. Typical variables are listed here as:

$X_A$=Aircraft characteristics, including but not limited to: weight, performance, fuel, user preference with respect to tolerable level of turbulence, user preference with respect to aircraft speed, and the like.

$t_s$=time at starting point $x_s(x, y, z)$=starting point for this segment in horizontal coordinates (x, y) and altitude (z).

$x_d(x, y, z)$=destination point for this segment in horizontal coordinates (x, y) and altitude (z).

$f_i$=fuel level at a point $x_i(x, y, z)$ in the flight path.

$W(t, v, u, x_i)$=a function which describes the winds, in terms of speed v and direction u, at any point in time t and location $x_i$.

$h(t, x_i, X_A)$=a function which describes the hazards which are extant in the space through which the path lies. The hazards are described in terms of location $x_i$ and severity. These hazards can be dynamic aviation weather hazards, such as turbulence and icing, or can be static hazards, such as mountain ranges and restricted airspace. The severity is defined as a function of the aircraft characteristics since the impact of the hazard can be a function of the aircraft.

Given these various factors, the total cost of traversing this segment is computed by summing the various cost factors. The cost factors can be defined in various ways, depending upon the aircraft and the factors that the user desires to consider in measuring the cost. The number of factors considered determine the computation complexity as well as the sophistication of the cost measurement and optimization. In addition, the various cost factors can be weighted to ascribe different emphasis to the various factors, as determined by the user, or the travel path determination system. The weighting factors $w_i$, noted in the general form of the equation, are presumed to be unity for the specific example provided herein to reduce the complexity of the computation in this example. It is obvious that the weighting factors can themselves be functions of a number of variables, such as type of flight: commercial passenger, commercial freight, military, private pleasure, and the like; or various other factors, such as: instrument rating of pilot, onset of darkness, preferred arrival times at the destination airport, and the like.

In the example used herein, the cost is measured by three factors for the purpose of illustrating the operation of this system and is given by the following equation:

Total cost $(C_T)=w_t*$time cost $(C_t)+w_f*$fuel cost $(C_f)+w_h*$hazard cost $(C_h)$ or, with unity weighting factors, the equation in the form of the various variables comprises:

$C_T(t_s, W, h, x_s, x_d, X_A, f_i) = C_t(t_s, W, h, x_s, x_d, X_A) + C_f(t_s, W, h, x_s, x_d, X_A, f_i) + C_h(t_s, h, x_s, x_d)$

Now, the total cost is therefore the sum of these three factors.

Time Cost

The time cost is determined by the length of the selected segment and the speed of the aircraft which traverses this segment. The basic time computation is modulated by the effects of hazards which effect the path of travel as well as ambient winds, both factors which change the elapsed time of travel. The aircraft performance factors also effect the time of travel, since the ability of the aircraft to climb/descend as well as operate in various crosswinds and at various altitudes impacts the time cost.

An example of the time cost computation is that if we assume that the crosswind loss is negligible and the loss in airspeed during a standard ascent, noted above from 5 km altitude to 6 km altitude is from 210 km/hr to 180 km/hr, and the winds are from the South, but change direction to from the Southwest and abate slightly while traversing this segment. Also assume that the change in altitude is accomplished from the starting point for this segment $x_s$, and the climb continues at a standard rate of ascent for this aircraft until the desired cruising altitude is reached. The time cost can be calculated exactly through the analytical solution of an integral equation or through a finite approximation of the integral. Using the latter method, the approximation is done by starting at the starting point for this segment $x_s$, at time $t_s$ and moving along the path defined by this segment for some small value of Ét, then calculating the distance traveled during this time interval Ét. This incremental travel computation is repeated for successive intervals of time Ét until the destination point $x_d$ is reached. The computation performed for each time interval along the length of the segment is performed using the winds that are present during that time interval at that locus on the segment and for the particular ascent/descent profile for this aircraft.

Figure 7:
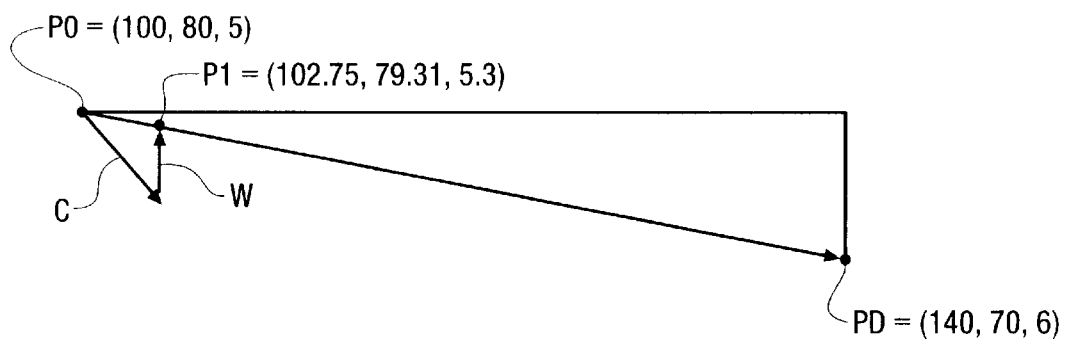

The particular values for this computation using the above noted example are given herein. In particular, assume that the wind function $W(t, u, v, x_i)=(t, u, v, x_i)=(t, 30, 180\%, x_i)$ for this example. Thus, the wind is constant from the South with no vertical component for the entirety of this segment. In the example given, the location of the aircraft at the starting point $x_s$ is given by the coordinates (100, 80, 5) and the destination point $x_d$ is given by the coordinates (140, 70, 6). If the standard rate of climb for this aircraft is 5 m/sec at an airspeed of 180 km/hr and the climb is constant until the altitude changes from 5 km to 6 km, it takes 200 seconds to achieve the change in altitude. If the sampling interval Ét is 1 minute, then the system can compute in a timely manner changes in the heading of the aircraft, such as that shown in FIG. 7 to compensate for the steady wind from the south and the vector direction of the course is illustrated diagrammatically by the heading C in FIG. 7. Thus, the aircraft is oriented along the heading defined by segment C, but is blown by the ambient winds to the North by an amount given by vector W to thereby reach the point P1 at the end of the 1 minute initial sampling interval. Thus, in the 1 minute interval from the starting point $x_s$, the aircraft changes altitude to 5.3 km and the new location on the path P1, accounting for the presence of the wind, is the coordinates: (102.75, 79.31, 5.3). In order to remain on course, heading for the destination point $x_d$ given by the coordinates (140, 70, 6), the pilot must continue directing the airplane into the wind at the same heading to compensate for its effect on the travel of the aircraft. This process is repeated for the successive time intervals, with the temporal value of the wind being determined for each portion of the segment to correspond to the presence of the aircraft on that portion of the segment, to thereby compute the predicted path taken by the aircraft over this segment. Using these computed portions of the segment, the overall time required to traverse the segment can be determined.

Fuel Cost

The above computations provide an indication of the time cost to traverse the segment of the travel path. In addition, the data generated during that process can be used to determine the fuel cost for the segment. The fuel cost represents the quantity of fuel consumed by the aircraft in traversing each portion of the segment. The fuel consumption measurement is a function of the aircraft performance characteristics at the present altitude; whether the aircraft is climbing, descending, or in level flight; aircraft speed and acceleration; ambient winds; weight of the aircraft, including time-varying fuel level. The fuel consumption determined for each portion of the segment can then be summed to determine the overall fuel cost for the segment of the travel path.

Hazard Cost

The above computations provide an indication of the time cost and fuel cost to traverse the segment of the travel path. In addition, the data generated during these processes can be used to determine the hazard cost for the segment. The hazard cost represents the impact of various hazards on the aircraft as it traverses the segment. In particular, a function can be defined which quantifies the effect of the hazards on the aircraft. This can include a measure of the relative comfort or safety of the travel as the aircraft is impacted by the phenomena extant ion the multidimensional space. As with the other cost factors, the overall cost for hazards is determined by summing the individual hazard cost figures for each of the portions of the segment to arrive at a total hazard cost for the segment.

Totalizing the Costs

The above-computed costs are not all presented in unitless values. It is obvious that the time cost is typically measured in minutes, while the fuel consumption is measured in gallons. To determine the overall cost for this segment, the various cost factors must be converted to equivalent unitless or base unit values. This can be relative values, such as a percentage of a normal value (ex: 120% of standard fuel consumption) or other form of unitless measure. The resultant unitless values can then be summed to arrive at a composite cost for the segment.

Single Source Optimized Path

The problem of determining the optimal path, given the above-described method of determining costs for each segment in the system, represents the solution of the "shortest path" problem. This is a well-known problem wherein the shortest path from an origination point to a destination point must be determined. In the present case, the "shortest" measurement corresponds to "least cost" using the identified cost factors. In the shortest path problem, a weighted, directed graph is used with a weight function to map the edges of the directed graph to real-valued weights. The shortest path is therefore the path with the lowest value of the sum of the weights of the path segments.

The determination of the shortest path is typically accomplished by use of the technique known as relaxation, wherein an upper bound on the estimated shortest path weight of each node in the directed graph is repeatedly decreased until the upper bound equals the shortest path weight. This technique is well known and simplifies the computational complexity of the problem. Implementations of this algorithm are found in Dijkstra's algorithm and the Bellman-Form algorithm, which are textbook example of such computations. Once this approximation to the optimal path, constrained to pass through graph nodes, is found, a better approximation can be found by iteratively moving the points in the gradient direction until a sufficiently smooth path is found.

Alternate Applications

The above description focuses on a travel path from an origination point to a destination point where the multidimensional space is uniformly divided into slices. However, there is no necessity for this uniformity. An example of such an instance is where all of the cost factors/hazards are localized in the multidimensional space. Once the vehicle passes this hazard region, the remainder of the multidimensional space may be substantially uniform and the final "leg" of the travel path may encompass multiple slices or a final slice of great extent. The computation can then be alternatively viewed as a travel path from an origination point to any one of N nodes which form the distant boundary of the hazard space, since the final leg provides no variation in the cost of the travel path. Thus, the subtraction or elimination of a constant cost extent of the multidimensional space is encompassed within the present system.

Figure 8:
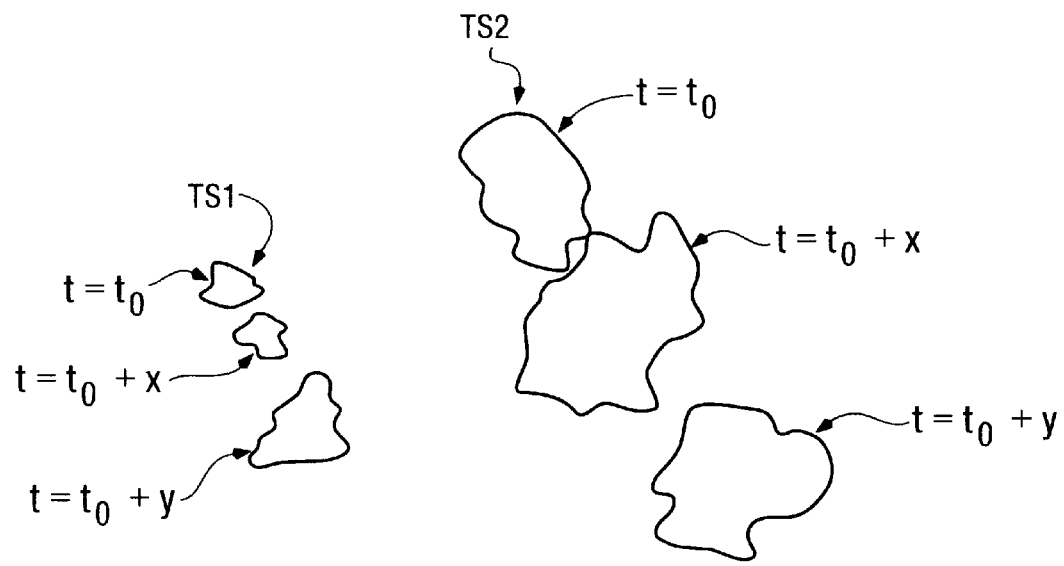
FIG. 8 illustrates a further application of the present system for determining a travel path in a multidimensional space.
Figure 8:
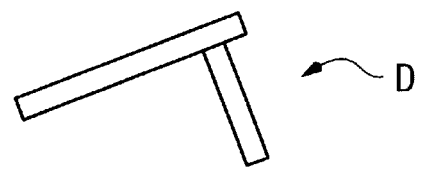

Another application is illustrated in FIG. 8 where the hazard lies beyond the destination point. The hazard illustrated comprises two thunderstorms TS1 and TS2 which lie past the destination point D. To simplify the computation, the three-dimensional thunderstorm can be viewed as a two-dimensional phenomena and the possibility of altitude changes constrained. The thunderstorms TS1 and TS2 can then be more effectively (in computational efficiency) tracked. The present location of thunderstorms TS1 and TS2 are noted as $t=t_0$ and the position/shape/size can be extrapolated: forecast with reasonable validity over the time period in question for times $t=t_0+x$ and $t=t_0+y$. The location of these hazards and their potential impact on the vehicle can be factored into the computation to ensure that the peripheral impacts (wind, turbulence) are considered in computing the minimal cost travel path and/or the travel path is selected to avoid the arrival of the hazard at the destination point prior to the arrival of the vehicle at the destination point.

Summary

Thus, the present automated travel path determination system has the capability to address time varying phenomena, time varying costs and interactive initial conditions to determine an optimum travel path through the multidimensional space.

What is claimed:

1. A system for determining a travel path for a vehicle from a first locus to a second locus through a multidimensional space comprising:

means for storing vehicle performance data which identifies operating characteristics of at least one vehicle which is operable to traverse said multidimensional space from said first locus to said second locus;

means for determining a presence, locus and extent of vehicle performance effecting phenomena extant in said multidimensional space; and means for computing a travel path from said first locus to said second locus through said multidimensional space for a said vehicle as a function of said vehicle performance data associated with said vehicle and said determined vehicle performance effecting phenomena.

2. The system of claim 1 further comprising:

means for transmitting said travel path to said vehicle.

3. The system of claim 2 further comprising:

means for periodically activating said means for computing and said means for transmitting for producing periodic updates of said travel path for said vehicle.

4. The system of claim 2 further comprising:

means, responsive to communication signals received from said vehicle, for activating said means for computing and said means for transmitting for producing an update of said travel path for said vehicle.

5. The system of claim 1 wherein said means for storing vehicle performance data comprises:

means for receiving data from said vehicle which uniquely identifies said vehicle.

6. The system of claim 5 wherein said means for storing vehicle performance data further comprises:

means for receiving data from said vehicle which defines operating characteristics of said vehicle.

7. The system of claim 1 wherein said means for determining comprises:

means for identifying meteorological phenomena extant in said multidimensional space.

8. They system of claim 7 wherein said means for determining further comprises:

means for mapping said meteorological phenomena into at least one region of hazard.

9. The system of claim 1 further comprising:

means for identifying the presence and locus of vehicles extant in said multidimensional space; and wherein said means for computing is responsive to vehicle presence and locus data received from said means for identifying vehicles for altering said travel path as a function of proximity of other vehicles to said travel path.

10. The system of claim 1 wherein said means for computing comprises:

means for partitioning said multidimensional space, at least between said first locus and said second locus, into a directed graph containing a plurality of nodes and directed edges which interconnect said plurality of nodes, said directed graph extending in at least two dimensions;

means for assigning a cost of vehicle travel to each of said directed edges, said cost of vehicle travel being representative of a predetermined measure of vehicle travel performance for said vehicle traversing said directed edge; and means for determining a sequence of said directed edges from said first locus to said second locus representative of a desired cost of vehicle travel, said sequence of said directed edges comprising said travel path.

11. The system of claim 10 wherein said means for partitioning creates a three-dimensional array of nodes and directed edges with each node in a two-dimensional plane of said array being connected by a directed edge to every other node in said array which is closer to said second locus than said each node.

12. The system of claim 10 wherein said cost of vehicle travel assigned to each of said directed edges is a function of time, said means for determining a sequence of said directed edges comprises:

means for determining a departure time from said first locus for said vehicle;

means for computing each said cost of vehicle travel for each of said directed edges as a function of said departure time and a time required for said vehicle to reach each of said directed edges; and means, responsive to said means for computing cost of vehicle travel producing data indicative of a temporal value of cost of vehicle travel for each of said directed edges, for determining said desired cost as a temporally-dependent quantity.

13. The system of claim 12 wherein said means for determining a sequence of said directed edges further comprises:

means for periodically activating said means for computing cost of vehicle travel and said means for determining said desired cost for producing periodic updates of said sequence of said directed edges.

14. The system of claim 12 wherein said means for determining a sequence of said directed edges further comprises:

means for activating said means for computing cost of vehicle travel and said means for determining said desired cost from a present locus of said vehicle on said travel path to said second locus for producing an update of said sequence of said directed edges from said present locus to said second locus.

15. The system of claim 1 wherein said vehicle performance data comprises at least one variable from the class of variables which include but are not limited to: speed, fuel consumption, measure of safety, complexity of travel path, measures of atmospheric conditions.

16. The system of claim 1 wherein said means for computing a travel path comprises:

means for computing cost of vehicle travel data from said first locus to said second locus for each of a plurality of cost of vehicle travel variables;

means for storing data indicative of weighting factors for each of said cost of vehicle travel variables; and means for computing a desired cost of vehicle travel from said cost of vehicle travel data and said weighting factors.

17. The system of claim 1 wherein said vehicle comprises an aircraft and said multidimensional space includes an airspace located between said first locus and said second locus, said means for computing a travel path determines a series of headings, operating altitudes and distances, which series comprises a flight plan for said aircraft.

18. A method for determining a travel path for a vehicle from a first locus to a second locus through a multidimensional space comprising the steps of:

storing in a memory vehicle performance data which identifies operating characteristics of at least one vehicle which is operable to traverse said multidimensional space from said first locus to said second locus;

determining a presence, locus and extent of vehicle performance effecting phenomena extant in said multidimensional space; and computing a travel path from said first locus to said second locus through said multidimensional space for said vehicle as a function of said vehicle performance data associated with said vehicle and said determined vehicle performance effecting phenomena.

19. The method of claim 18, wherein said method is operable on a computer system located remote from said vehicle, said method further comprises the step of:

transmitting said travel path to said vehicle.

20. The method of claim 19 further comprising the step of:

periodically activating said step of computing and said step of transmitting for producing periodic updates of said travel path for said vehicle.

21. The method of claim 19 further comprising the step of:

activating, in response to communication signals received from said vehicle, said step of computing and said step of transmitting for producing an update of said travel path for said vehicle.

22. The method of claim 18 wherein said step of storing vehicle performance data comprises:

receiving data from said vehicle which uniquely identifies said vehicle.

23. The method of claim 22 wherein said step of storing vehicle performance data further comprises:

receiving data from said vehicle which defines operating characteristics of said vehicle.

24. The method of claim 1 wherein said step of determining comprises:

identifying meteorological phenomena extant in said multidimensional space.

25. They method of claim 24 wherein said step of determining further comprises:

mapping said meteorological phenomena into at least one region of hazard.

26. The method of claim 18 further comprising the step of:

identifying the presence and locus of vehicles extant in said multidimensional space; and wherein said step of computing is responsive to vehicle presence and locus data received from said step of identifying vehicles for altering said travel path as a function of proximity of other vehicles to said travel path.

27. The method of claim 18 wherein said step of computing comprises:

partitioning said multidimensional space, at least between said first locus and said second locus, into a directed graph containing a plurality of nodes and directed edges which interconnect said plurality of nodes, said directed graph extending in at least two dimensions;

assigning a cost of vehicle travel to each of said directed edges, said cost of vehicle travel being representative of a predetermined measure of vehicle travel performance for said vehicle traversing said directed edge; and determining a sequence of said directed edges from said first locus to said second locus representative of a desired cost of vehicle travel, said sequence of said directed edges comprising said travel path.

28. The method of claim 27 wherein said step of partitioning comprises:

creating a three-dimensional array of nodes and directed edges with each node in a two-dimensional plane of said array being connected by a directed edge to every other node in said array which is closer to said second locus than said each node.

29. The method of claim 27 wherein said cost of vehicle travel assigned to each of said directed edges is a function of time, said step of determining a sequence of said directed edges comprises:

determining a departure time from said first locus for said vehicle;

computing each said cost of vehicle travel for each of said directed edges as a function of said departure time and a time required for said vehicle to reach each of said directed edges; and determining, in response to said step of computing cost of vehicle travel producing data indicative of a temporal value of cost of vehicle travel for each of said directed edges, said desired cost as a temporally-dependent quantity.

30. The method of claim 29 wherein said step of determining a sequence of said directed edges further comprises:

periodically activating said step of computing cost of vehicle travel and said step of determining said desired cost for producing periodic updates of said sequence of said directed edges.

31. The method of claim 29 wherein said step of determining a sequence of said directed edges further comprises:

activating said step of computing cost of vehicle travel and said step of determining said desired cost from a present locus of said vehicle on said travel path to said second locus for producing an update of said sequence of said directed edges from said present locus to said second locus.

32. The method of claim 18 wherein said vehicle performance data comprises at least one variable from the class of variables which include but are not limited to: speed, fuel consumption, measure of safety, complexity of travel path, measures of atmospheric conditions.

33. The method of claim 18 wherein said step of computing a travel path comprises:

computing cost of vehicle travel data from said first locus to said second locus for each of a plurality of cost of vehicle travel variables;

storing data indicative of weighting factors for each of said cost of vehicle travel variables; and computing a desired cost of vehicle travel from said cost of vehicle travel data and said weighting factors.

34. The method of claim 18 wherein said vehicle comprises an aircraft and said multidimensional space includes an airspace located between said first locus and said second locus, said step of computing a travel path comprises:

determining a series of headings, operating altitudes and distances, which series comprises a flight plan for said aircraft.

* * * * *